(12) United States Patent
Yamamura

(10) Patent No.: US 7,630,137 B2
(45) Date of Patent: Dec. 8, 2009

(54) LENS ARRAY, EXPOSURE DEVICE, AND IMAGE FORMING APPARATUS

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 11/692,218

(22) Filed: Mar. 28, 2007

(65) Prior Publication Data

US 2007/0229965 A1 Oct. 4, 2007

(30) Foreign Application Priority Data

Mar. 31, 2006 (JP) ............................. 2006-097902

(51) Int. Cl.
G02B 3/00 (2006.01)
G02B 9/00 (2006.01)

(52) U.S. Cl. ...................... 359/654; 359/652

(58) Field of Classification Search ................ 359/652, 359/654, 806
See application file for complete search history.

(56) References Cited

U.S. PATENT DOCUMENTS

| 5,959,783 A | * | 9/1999 | Kittaka et al. | ................ | 359/654 |
| 5,978,146 A | * | 11/1999 | Kittaka et al. | ................ | 359/654 |
| 6,031,668 A | * | 2/2000 | Toyama et al. | ................ | 359/652 |
| 6,078,431 A | * | 6/2000 | Kittaka et al. | ................ | 359/654 |
| 6,115,187 A | * | 9/2000 | Tabata et al. | ................ | 359/654 |
| 6,330,116 B1 | * | 12/2001 | Kittaka | ................ | 359/654 |
| 6,366,408 B1 | * | 4/2002 | Kittaka et al. | ................ | 359/620 |
| 6,429,977 B2 | * | 8/2002 | Kittaka | ................ | 359/654 |
| 7,417,659 B2 | * | 8/2008 | Yamamura | ................ | 347/241 |

FOREIGN PATENT DOCUMENTS

JP 2003-114306 A 4/2003

* cited by examiner

*Primary Examiner*—David N Spector
(74) *Attorney, Agent, or Firm*—Panitch Schwarze Belisario & Nadel LLP

(57) ABSTRACT

A lens array has a plurality of rod lenses with optical axes in parallel with one another, in which the rod lens has a refractive-index distribution in a radial direction. The lens array has a radius ratio $r_0/r$ set to 0.9 or smaller, in which a radius r of the rod lens is set as the radius of the rod lens when the refractive-index distribution is formed, and in which a radius $r_0$ of the rod lens is set as the radius of the rod lens when all or part of an outer periphery of the rod lens is removed after formation of the refractive-index distribution.

15 Claims, 15 Drawing Sheets

LENS ARRAY, EXPOSURE DEVICE, AND IMAGE FORMING APPARATUS

BACKGROUND OF THE INVENTION

This invention relates to a lens array used for an image transmitter such as, e.g., an electronic printer, a facsimile machine, and a scanner, to an exposure device adopting the lens array, and to an image forming apparatus furnished with the exposure device.

Lens arrays (or rod lens arrays) in which a plurality of minute rod lenses in a cylindrical shape are arrayed are used as lens for an image transmitter built into an apparatus such as, e.g., an electronic printer, a facsimile machine, and a scanner. A rod lens is an optical lens made of a cylindrical-shaped resin or glass material with a refractive-index distribution in a radial direction. A lens array is an optical component in which the plurality of rod lenses are arrayed and unified, and is used as one part of an image sensor of a photocopier, the scanner, or the like. The lens array is also used as an exposure device forming an exposure image on a photoreceptor at a high resolution in combination with a luminous source such as an LED (Light Emitting Diode) in various apparatuses and particularly in electrophotographic systems.

In recent years, since high quality improvement is required for formed images, the exposure device is also required to improve resolution to around, e.g. 1200 dpi in order to achieve improvement in image quality. As a technique for improving the image quality, such a rod lens has been widely known whose refractive-index decreases continuously from a central axis to an outer periphery, and which is provided with a light absorbing layer having a thickness of 50 microns or greater in a range outside the range of 0.6 of the radius of the rod r or greater from the central axis of the rod lens. The light absorbing layer contains a light absorbent for absorbing at least part of the light transmitted through the rod lens (see, e.g., Japanese Patent Laid-Open Publication No. 2003-114306).

However, in a case of formation of an exposure image at a high resolution on a photoreceptor by the aforementioned conventional technique, the exposure image has insufficient contrast between a bright section and a dark section. For example, where the image forming apparatus forms an image at 1200 dpi or higher resolution, i.e., a resolution of 1200 dots per inch, the image quality deteriorates in terms of granular quality or a blur of a thin line in a halftone image, and the like. By the method for forming the light absorbing layer described in Japanese Patent Laid-Open Publication No. 2003-114306, it is not easy to form the light absorbing layer having a predetermined micron-size thickness that uses a light absorbent such as a dye. The resulting variation in thickness directly leads to deterioration in optical characteristics.

In consideration of the foregoing technical problems, this invention is intended to provide a lens array which can prevent deterioration in image quality even in a case of forming the image at high resolution, and allow easy manufacturing with the stable optical characteristics.

BRIEF SUMMARY OF THE INVENTION

In consideration the foregoing technical problems, a lens array is formed of a plurality of rod lenses the longitudinal axes of which are in parallel with one another. Each rod lens has an effective radius of $r_0$. Each rod lens is initially formed with a radius r greater than $r_0$. A refractive index distribution in a radial direction is formed in the lens rod of radius r. All or part of an outer periphery of each rod lens is removed after formation of the refractive-index distribution, resulting in each rod having the effective radius $r_0$ when the lens array is formed. The radius ratio $r_0/r$ is set to 0.9 or smaller.

In a first aspect of the invention, the lens array is formed of lens rods with an effective radius of $r_0$ by roughening the periphery of the rod lenses and by arranging the rod lenses in one or more lines with a filler applied into gaps between the rod lenses.

In a second aspect of the invention, the lens array is formed of lens rods with an effective radius of $r_0^*$ by providing the outer periphery of the rod lens with a light-impervious portion in the vicinity of the of the side surface of the rod and by arranging the rod lenses in one or more lines with a filler applied into gaps between the rod lenses.

According to a third aspect of this invention, a lens array having a plurality of rod lenses with optical axes in parallel with one another, in which the rod lens has a refractive-index distribution in a radial direction, has a relation set to $r_1 \leq 0.015$ TC+0.113, where conjugation length TC (mm) is set as a length between an object face of a lens array and an imaging surface, and where radius $r_1$ is set as a radius of the rod lens' portion through which a light beam from a luminous source can pass. This relation was discovered by the inventor, et al. by calculation based on a desirable MTF (Modulation Transfer Function) value, and is a numerical range in which deterioration in image quality in terms of granular quality or a blur of a thin line in a halftone image, and the like can be resolved.

It was discovered that a similar relation is set in an image forming apparatus furnished with the lens array as described above. As one example of the image forming apparatus of this invention, the image forming apparatus performing exposure process using a lens array having a plurality of rod lenses with optical axes in parallel with one another, in which the rod lens having a refractive-index distribution in a radial direction, has a relation set to $r_1 \leq 0.015$ Lw+0.113, wherein a distance Lw (mm) is set between a light emitting point of a luminous source emitting a light beam into the lens array and a photosensitive layer of a latent image forming member, and where radius $r_1$ is set as a radius of the rod lens' portion through which a light beam from a luminous source can pass. Furthermore, according to a preferred embodiment of this invention, the distance Lw (mm) is set to satisfy an $9.1 \leq Lw \leq 15.1$, and the deterioration in image quality is solved as well.

According to one example of the lens array in this invention, the fluctuation part in the refractive-index distribution formed at the outer periphery portion of the rod lens can be removed by setting the radius ratio $r_0/r$ to 0.9 or smaller, thereby being able to prevent adverse effects of the fluctuation part on the optical characteristics. Therefore, clear images with high contrast can be achieved by applying the lens array according to this invention to the exposure device of the image forming apparatus in electrophotographic system. Furthermore, according to another example of the lens array in this invention, the light-impervious portion for blocking out the light beam from the luminous source is formed to the outer periphery of the rod lens, so that the light-impervious portion for blocking out the light beam functions as a type of an aperture stop to limit a scattered light, thereby achieving improvement in the resolution.

The lens array or the image forming apparatus according to this invention which determines a range of the radius $r_1$ of the rod lens by calculation based on a desired value MTF, can resolve deterioration in image quality in terms of granular quality or a blur of a thin line in a halftone image, and the like, thereby resulting in good printing characteristics.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

First Embodiment

Figure 1:
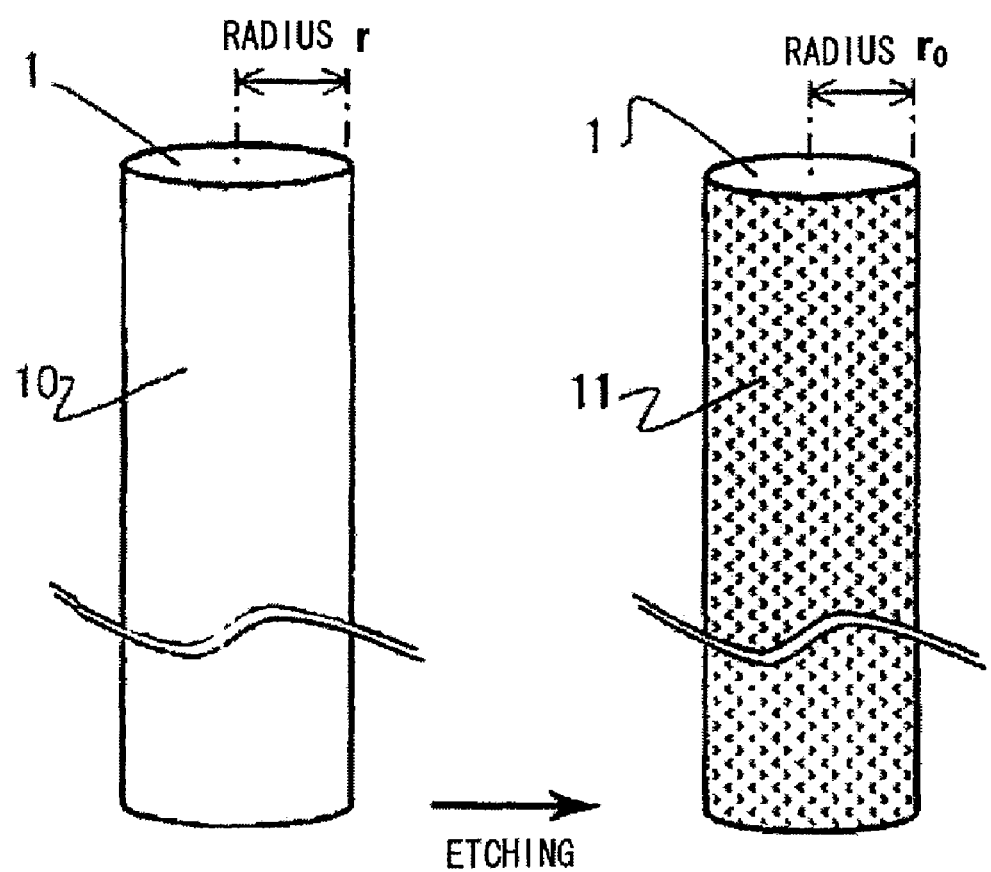
FIG. 1 is a perspective view showing a rod lens according to a first embodiment of this invention.

A lens array according to a first embodiment of this invention will be explained with reference to drawings. FIG. 1 is a perspective view showing a rod lens composing the lens array according to this embodiment. The lens array according to this embodiment adopts the rod lens that is formed by processing glass. For example, a rod lens made from glass is formed by a direct spinning method (continuous spinning method). In the method for forming the lens array, first, the glass is melted and shaped by the spinning method, thereby the glass being cut into a predetermined size. The glass fiber, which was cut out, is then subject to an ion-exchange process to form a refractive-index distribution, thereby becoming a rod lens 10 of radius r. The rod lens is then subject to an etching process to remove a portion of the outer periphery 10 to form a radius of $r_0$. Subsequently, a side surface 11 of the rod lens is subject to a roughening process and coated with a black dye. The plurality of rod lenses, which was subject to the roughening process, is arrayed and secured to compose a lens array sheet. The lens array sheet is then cut into a desired length and both end portions are ground.

Each of the processes is explained in more detail. The glass as raw material, which was subject to a melting process, a defoaming process, and a clarification process, is kept hot by a heater while a platinum crucible with a nozzle is used. The glass is then gradually cooled down while being flowed down through the nozzle in a cylindrical shape. Subsequently, the glass is flowed out of a lower end of the nozzle, thereby continuously forming glass rods (fibers) with a diameter of approximately 0.1 to 4 mm by a hot stretching. The direct spinning method achieves extremely high productivity since a spinning speed can be set dozens of times faster than that of a rod-spinning method and the glass as raw material can be continuously poured to enable continuous production. For example, a radius and a length were uniformly set to be 0.28 mm and 130 mm, respectively. The glass fiber according to this embodiment had composition as provided in following Table 1.

| Component | Composition Ratio |
| --- | --- |
| $SiO_2$ | 56 |
| MgO | 10 |
| $Li_2O$ | 15 |
| $Na_2O$ | 10 |
| $TiO_2$ | 7 |
| $ZrO_2$ | 2 |

Next, the rod lens is formed from the glass fiber by forming a refractive-index distribution from a central axis to the outer periphery by the ion-exchange process. In this embodiment, the glass fiber was held for about 50 hours in molten-salt of sodium nitrate kept at 530 degrees Celsius to perform the ion-exchange, thereby forming the rod lens. The rod lens having been subject to the ion-exchange process, took about one day to be cooled down in an electric furnace from approximately 530 degrees Celsius to room temperature so that cracking could be prevented from occurring due to thermal contraction at the time of cooling.

The rod lens is subsequently subject to an etching process. The purpose of the etching process is to melt and remove the outer periphery 10 of the rod lens using hydrofluoric acid solution, by which the diameter of the rod lens can be shaped into a desired size without changing the refractive-index distribution of the rod lens. The etching process removes such a portion that otherwise would cause deterioration in the optical characteristics of the rod lens since the refractive index in the vicinity of the outer periphery of the rod lens has a different value from the desired value in the refractive-index distribution due to the ion-exchange process. On the conditions that a radius after formation of the refractive-index distribution of the rod lens is set to be r and a radius after removal of a portion of the outer periphery (o.e. side surface) is set to be $r_0$, it has been turned out according to an empirical rule, images in a good condition are formed by processing the rod lens in a manner to satisfy:

$$r_0/r \leq 0.893 \text{(almost equal to 0.9)}, \quad \text{[Equation 1]}$$

and the high-quality printing with high contrast can be realized by removing the side surface (the outer periphery) as described above. In this embodiment, the etching process using the hydrofluoric acid solution was performed to the rod lenses in Comparative example 1 and Manufacturing examples 1 to 3 for a period provided in after-mentioned Table 2.

Following the etching process, a roughening process of the surface is performed on the rod lens, which was subject to the etching process. The purpose of the roughening process is to roughen and then coat the outer periphery 10 of the rod lens with the black dye in order to form a part for removing in a scattering manner a so-called flare light. The flare light is a light beam which does not contribute to formation of the exposure image and rather deteriorates the contrast of the exposure image, among light beams which pass from a luminous source through the rod lens. In this embodiment, the rod lens 1 was submerged for several minutes in a mixed solution of hydrofluoric acid and ammonium fluoride to form a roughened portion 11 as shown in FIG. 1. The surface of the rod lens having been subject to the etching process was in a rougher condition by this roughening process. The flare light was absorbed and removed by coating the surface with the black dye as a coloring agent.

Figure 2:
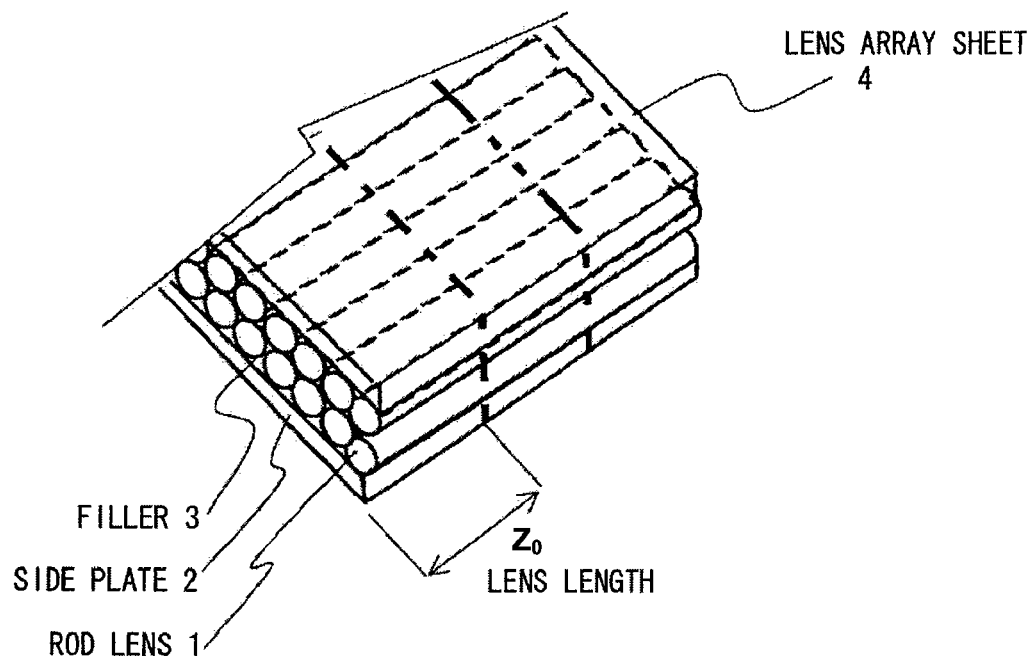
FIG. 2 is a perspective view showing a condition that the plurality of rod lenses is arrayed according to a first embodiment of this invention.

A lens array sheet 4 is formed by arraying the plurality of rod lenses 1 having been subject to the roughening process, as shown in FIG. 2. The lens array sheet 4 is formed by arranging the rode lenses in one or more lines between two side plates 2 and then filling a filler 3 into gaps between the rod lenses to secure the lenses. In this embodiment, as shown in FIG. 2, seven hundred and seventy (770) rod lenses 1 were arranged in two lines, and a width of lens array sheet 4, i.e., a width in a direction perpendicular to a central axis direction, was set to 220 mm. A glass-reinforced epoxy was used for the side plate 2 and a thermosetting black silicone resin was filled as the filler 3, thereby performing a heat hardening process for the formation.

Figure 3:
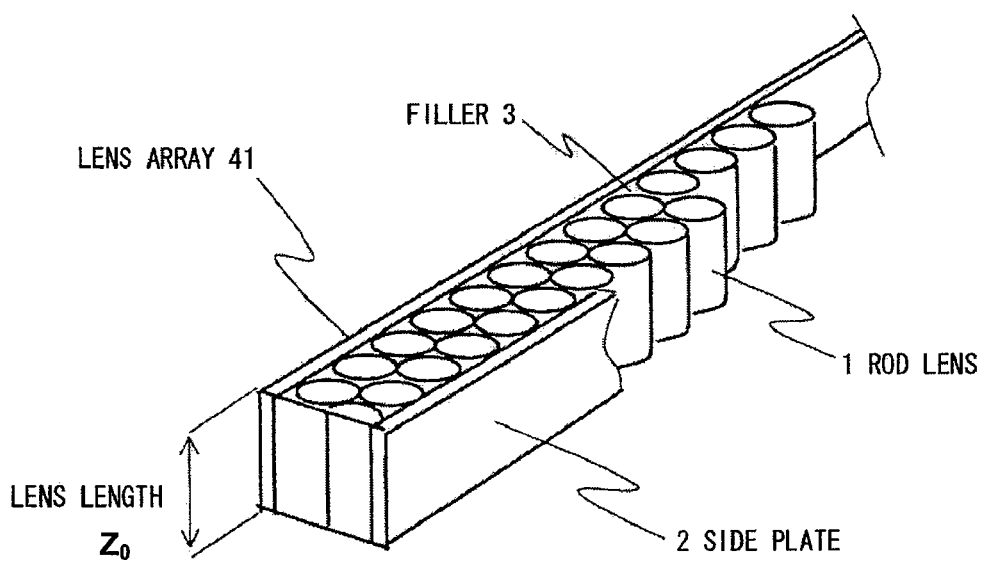
FIG. 3 is a perspective view showing a lens array composed of the rod lenses according to the first embodiment of this invention.

The array sheet 4 shown in FIG. 2 was cut in a direction perpendicular to a central axis direction of the rod lens 1, and both cross-sectional surfaces, which have been cut, were subject to an optical polishing to form a lens array 41 shown in FIG. 3. In this embodiment, a lens length $Z_0$ of the lens array 41 was as provided in Table 2. In this embodiment, an effective radius $r_0$ of the rod lens according to the manufacturing examples 1 to 3 was as provided in Table 2. In this embodiment, a focal length (Lf) and a modulation transfer function (MTF) of the lens array according to the manufacturing examples 1 to 3 were as provided in Table 2.

TABLE 2

|  |  | Comparative Example | Manufacturing Example 1 | Manufacturing Example 2 | Manufacturing Example 3 |
|---|---|---|---|---|---|
| Rod Lens Radius r [mm] | | 0.280 | 0.280 | 0.280 | 0.280 |
| Etching Processing Time [min] | | 0 | 1 | 2 | 3 |
| Effective Radius $r_0$ [mm] | | 0.272 | 0.261 | 0.250 | 0.240 |
| Removed Side Surface Amount Ratio $r_0/r$ | | 0.971 | 0.932 | 0.893 | 0.857 |
| Lens Length $z_0$ [mm] | | 4.400 | 4.400 | 4.400 | 4.400 |
| Optical Characteristics | Focal Length Lf [mm] | 2.350 | 2.350 | 2.350 | 2.350 |
| | MTF [%] | 66 | 72 | 81 | 84 |
| | Light Amount Ratio | 1.00 | 0.86 | 0.78 | 0.73 |
| Image Characteristics | | poor | poor | good | good |

MTF [%] in Table 2 is a value expressed by Equation 2 below. The image forming apparatus according to this embodiment has light emitting portions with intervals of approximately 0.021 [mm] on a LED array chip 51. Where every other light emitting portion is lighted up, Imax is set to the maximum value of the light amount of a portion corresponding to the light emitting portion of the exposure image by the lens array 41, while Imin is set to the minimum value of the light amount of a portion corresponding to the light not-yet emitting portions. The value of MTF expresses contrast of the exposure image; the value of 100 [%] is the maximum that expresses the highest contrast; as the value is smaller, the contrast of the exposure image becomes lower.

$$MTF = (I\max - I\min)/(I\max + I\min) \times 100 [\%] \quad \text{[Equation 2]}$$

Figure 4:
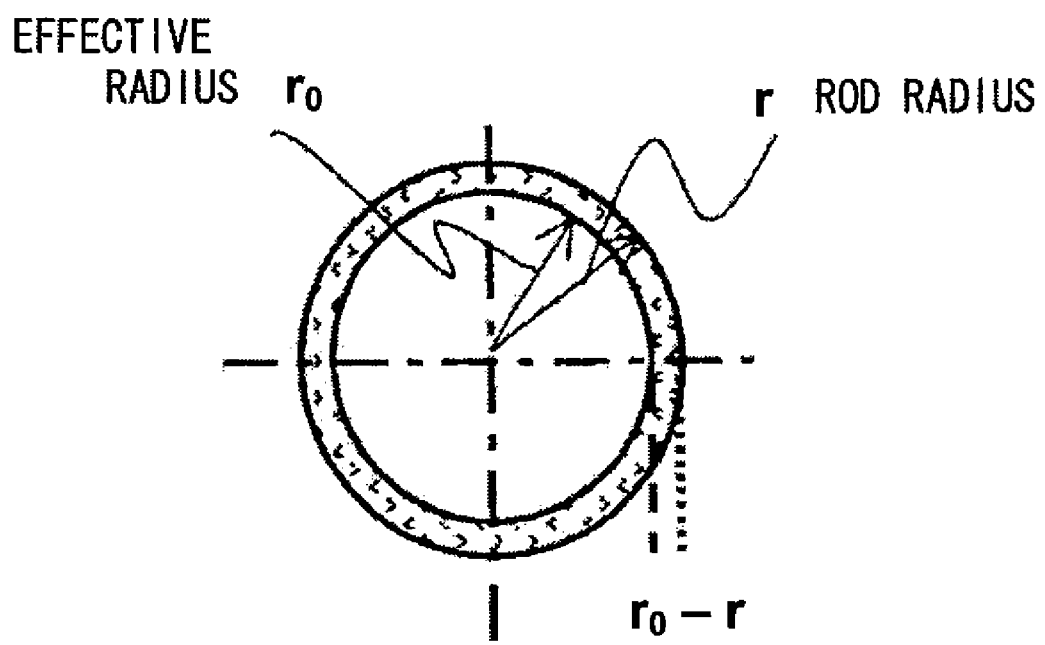
FIG. 4 is a top view of one example of the rod lens according to the first embodiment of this invention, in which a cutout portion is formed in a side surface.
Figure 5:
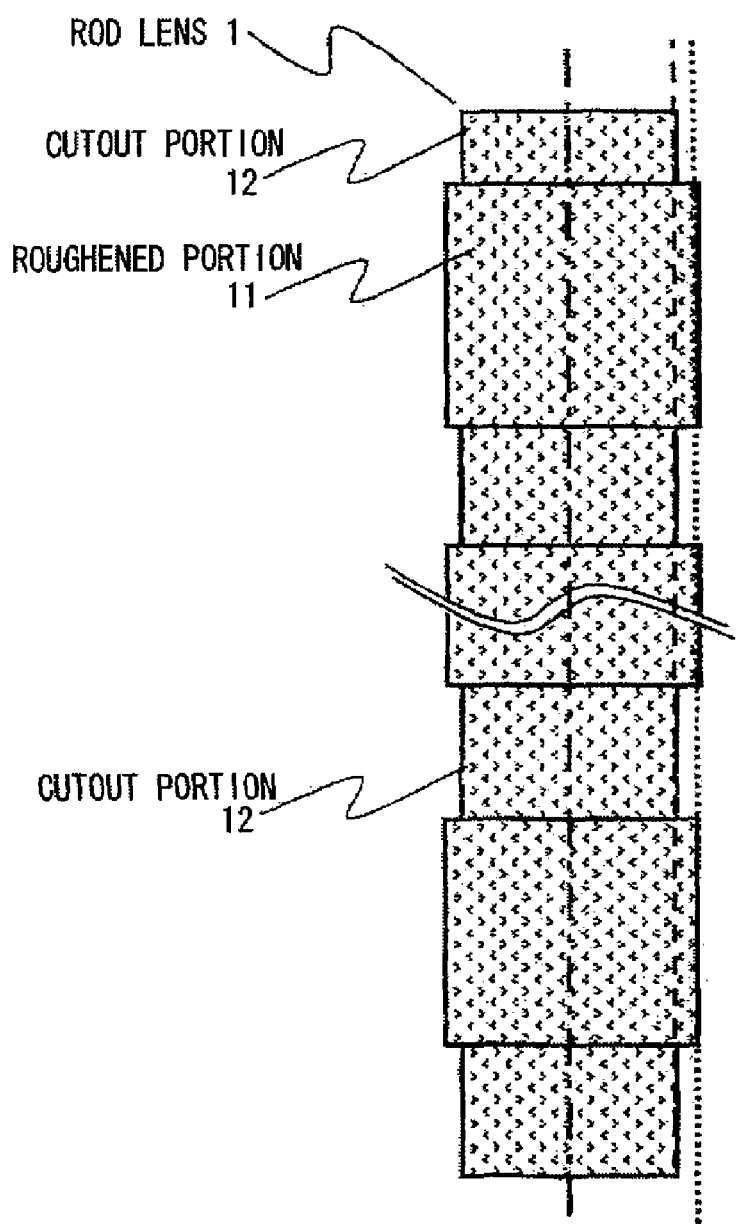
FIG. 5 is a side view showing one example of the rod lens according to the first embodiment of this invention, in which a cutout portion is formed in the side surface.

The focal length Lf is a distance between an end face of the lens array 41 and the light emitting portion of the LED array chip on a condition that the value MTF becomes the maximum. Herein, the lens array 41 according to this embodiment is not limited to such that formed by the manufacturing method as described above. As shown in FIGS. 4 and 5, for example, a part of the rod lens 1 may be provided with a cutout portion 12 to block out the light beam that passes through the outer periphery of the rod lens 1. At this time, the effective radius $r_0$ of the rod lens 1 is equal to a radius of the cutout portion 12.

Next an explanation is given of a method for manufacturing a lens array according to the Comparative example in comparison with the Manufacturing examples in this embodiment. The lens array according to example is formed through at least a plurality of processes: a process in which a glass is melted and shaped by the spinning method to be processed into a glass fiber with a predetermined thickness; a process in which the glass fiber is subject to the ion-exchange process to form a refractive-index distribution, thereby being processed into the rod lens; a process in which the side surface of the rod lens is subject to the roughening process and coated with the black dye; a process in which the plurality of rod lenses is arrayed and secured to form the lens array sheet; and a process in which the lens array sheet is cut into a desired length and both end portions are ground. That is, the method for manufacturing the lens array according to the Comparative example is different from that of the first embodiment in not including the process for removing the side surface portion of the rod lens by the etching process to process the rod lens into a predetermined thickness. The rod lens according to the Comparative example, which was manufactured through the aforementioned processes, has a structure and optical characteristics as provided in Table 2, respectively. The reason why the effective radius $r_0$ is smaller than the radius r of the rod lens in the Comparative example is that the rod lens 1 is provided with the roughened portion 11.

Figure 6:
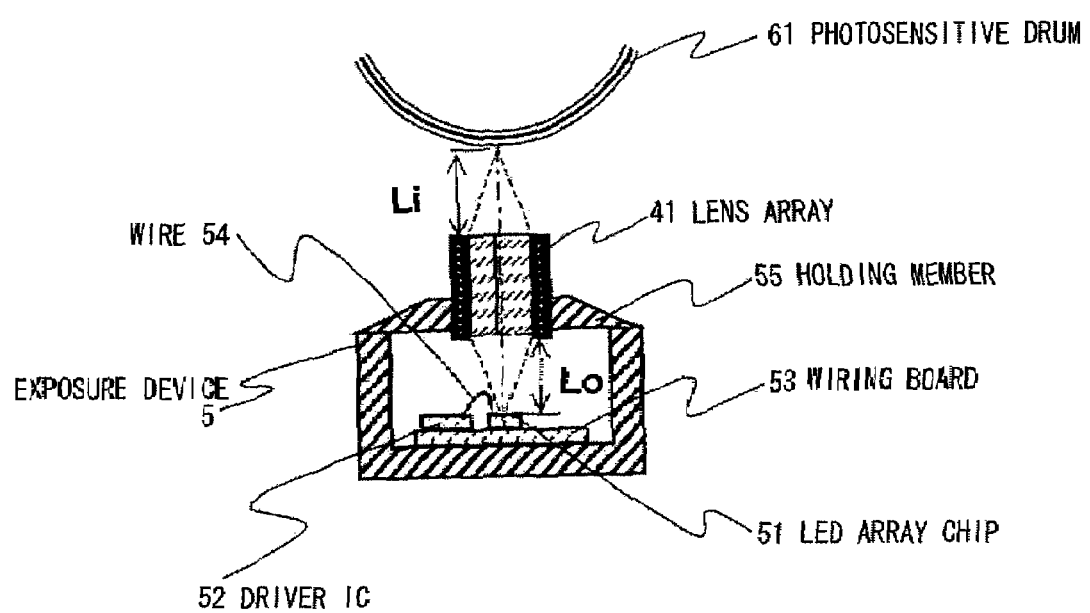
FIG. 6 is a view showing a frame format of an exposure device adopting the first embodiment of this invention.

A structure of the exposure device in this invention will be explained next with reference to drawings. Shown in FIG. 6 is a schematic cross-sectional view of the exposure device according to this invention, in which the exposure device 5 has a photosensitive drum 61 serving as a latent image carrier, the lens arrays 41 disposed in a manner to face to the photosensitive drum 61 with a predetermined distance therebetween, LED array chips 51, driver ICs 52, a wiring board 53, wires 54, and a holding member 55. The wiring board 53 is formed by providing a conductive pattern on an insulating substrate in a manner similar to those widely used. Furthermore, each of the LED array chips 51 has the LED elements as light emitting elements composing the plurality of light emitting portions. The drivers IC 52 and the LED elements are electrically connected, respectively, while the drivers IC 52 and the conductive pattern on the wiring board 53 are electrically connected.

In this embodiment, the exposure device 5 was used for an electrophotographic printer capable of printing an A4-size paper at 1200 [dpi] resolution. The light emitting portions were formed using three hundred and eighty four (384) substrate materials such as GaAsP with intervals of approximately 0.021 [mm] on the LED array chip 51. Twenty six (26) LED array chips were used on the wiring substrate 53. The wring board 53 was formed by providing the conductive pattern using a conductive material such as copper foil on a glass epoxy substrate, and a gold wire was used as the wire 54. The holding member 55 held the LED array chips 51 though the wiring substrate 53 in a predetermined position while holding the lens arrays 41 in a predetermined position with respect to a light emitting surface of each LED element of the LED array chips 51.

Figure 7:
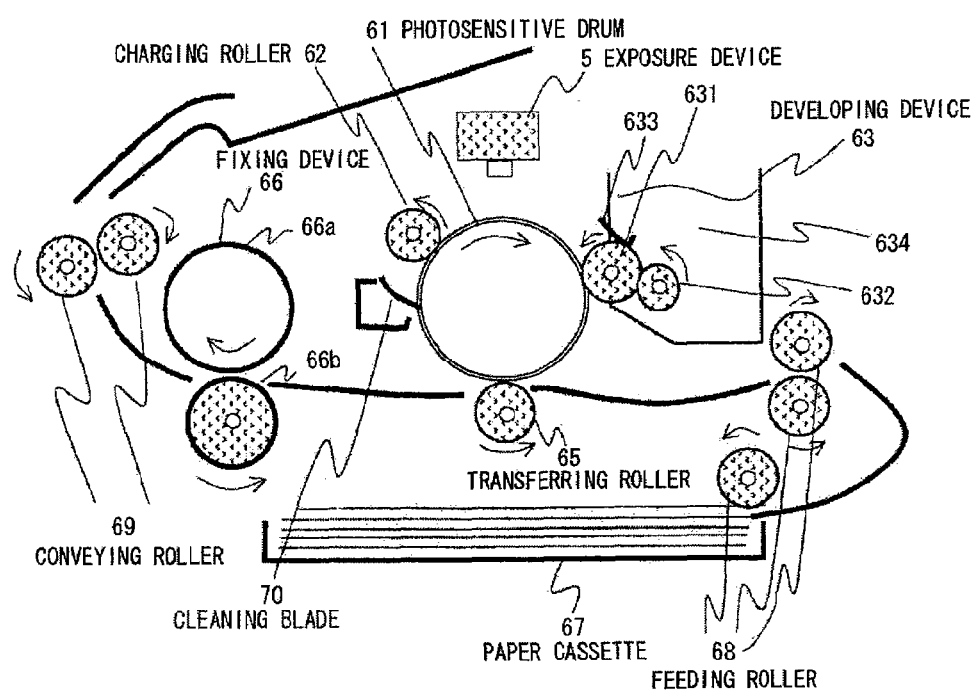
FIG. 7 is a view showing a frame format of an image forming apparatus adopting the first embodiment of this invention.

A structure of the image forming apparatus according to this invention will be described next. FIG. 7 is a schematic view showing the structure of the image forming apparatus according to the first embodiment. The image forming apparatus has the photosensitive drum 61 serving as a latent image carrier, a charging roller 62 serving as a charging device composed of a metal shaft and a semi-conductive rubber layer, a developing device 63, a developing roller 631 composed of a metal shaft and a semi-conducting rubber layer, a toner supplying roller 632 composed of a metal shaft and a semi-conducting rubber layer, and a developing blade 633, in which the predetermined amount of toner 643 is filled in a casing of the developing device 63.

The photosensitive drum 61 is formed by arranging a charge generating layer 61b serving as a photosensitive layer generating a charge according to the exposure image formed by the exposure device 5 on the conductive holding member 61a, and a charge transporting layer 61c for transporting the charge generated at the charge generating layer 61b to the vicinity of the surface of the photosensitive drum 61. A cleaning blade 64 for collecting the toner remaining on the photosensitive drum 61 without transferring to the medium, a transferring roller 65 serving as a transferring device for transferring a toner image formed on the photosensitive drum 61, and a fixing device 66 for fixing on the medium the toner image transferred to the medium, in which the fixing device 66 is composed of a heating roller 66a and a pressurizing roller 66b. This image forming apparatus is provided with a paper cassette 67 containing the media, a paper feeding roller 68 for feeding the medium to the vicinity of the transferring device 65, and a conveying roller 69 for conveying the medium having past through the fixing device 66.

Figure 8:
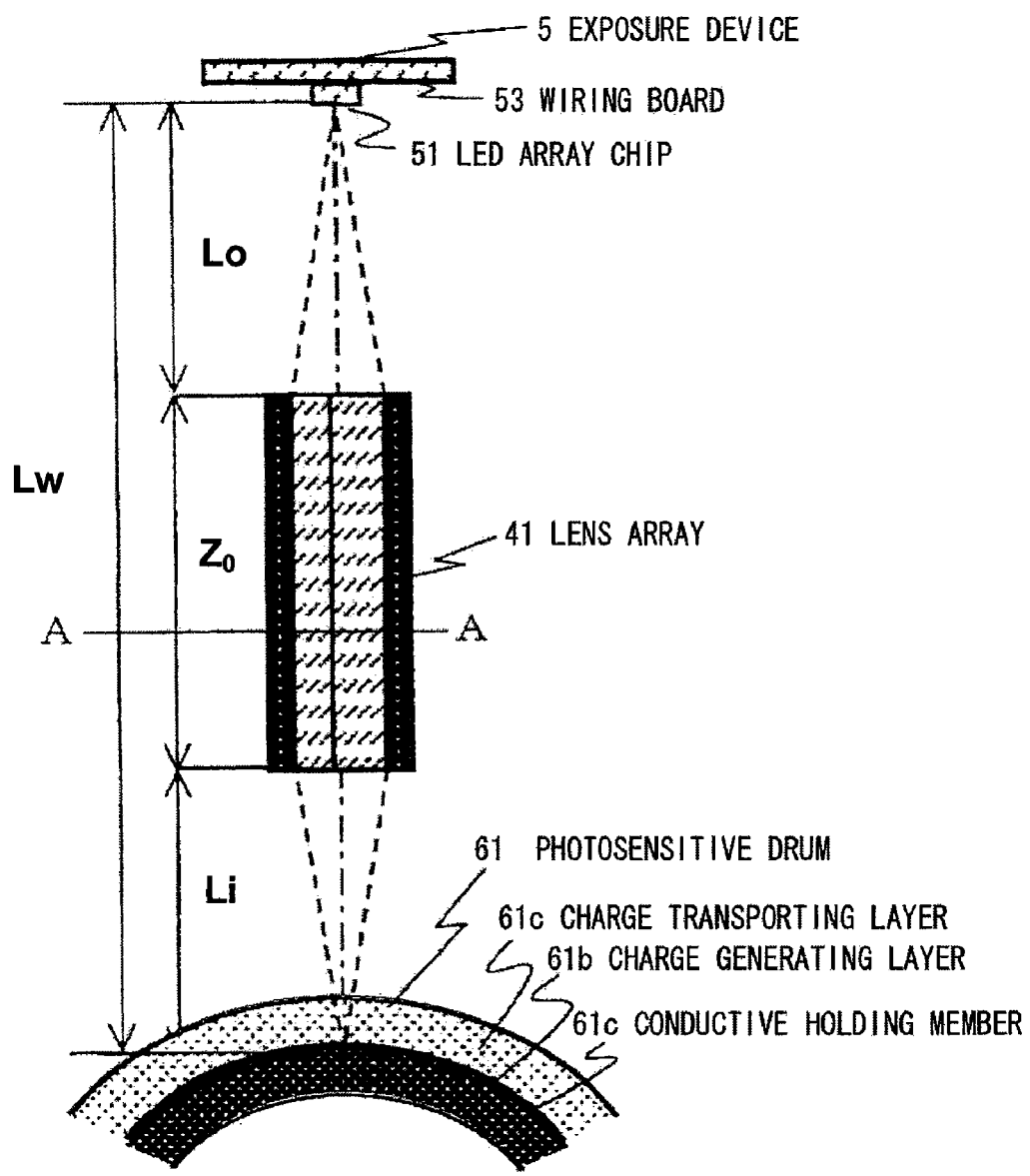
FIG. 8 is a view showing a substantial frame format of the image forming apparatus adopting the lens array composed of the rod lenses according to the first embodiment of this invention.
Figure 9:
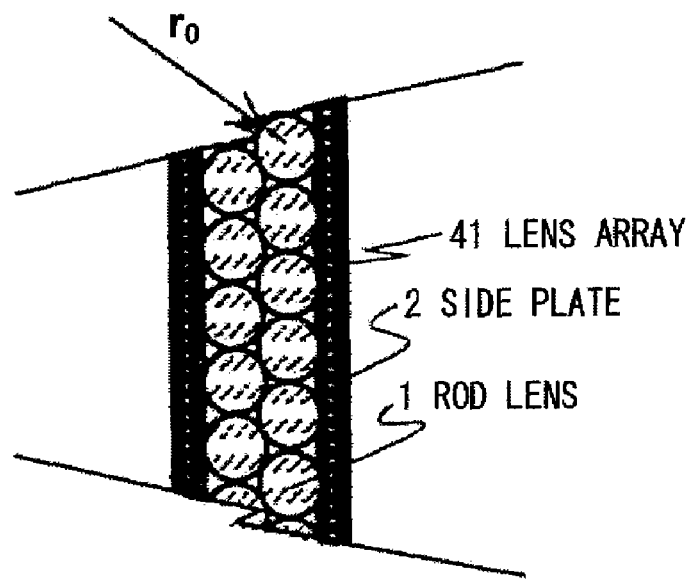
FIG. 9 is a cross-sectional view along the line A-A in FIG. 8.

As shown in FIGS. 8 and 9, the lens array 41 and the exposure device 5 in the image forming apparatus are disposed in a manner to line up in a radial direction of the photosensitive drum 61. The focal length Lf of the lens array 41 is set to a distance between the end face of the lens array 41 and a light emitting point of the LED array chip on a condition that the value MTF becomes the maximum. In this embodiment, a distance Lw between the charge generating layer 61b of the photosensitive drum 61 and the LED array chip 51 is set to $Lw=Li+Lo+Z_0$. A distance Lo between the LED array chip 51 and the end face of the lens array 41 is equal to the focal length Lf of the lens array 41 while a distance Li between the charge generating layer 61b of the photosensitive drum 61 and the end face of the lens array 41 is equal to the focal distance Lf of the lens array 41. More specifically, Li=Lo=Lf [mm] is set.

Operation of the exposure device shown in FIG. 6 will be explained next. The drivers IC 52 are driven to render the LED elements selectively emit light while correcting deviations in the light emission amount of the LED elements of the array chips 51, respectively. The aforementioned rod lenses composing the lens array 41 have the refractive-index distribution, so that the light emitted from the light emitting portions converts on the lens array 41, thereby forming the exposure image on the photosensitive drum 61.

Operation of the image forming apparatus shown in FIG. 7 will be explained next. In the electrophotographic recording, the image is recorded through the processes, i.e., a charging process, an exposure process, a developing process, a transferring process, a fixing process, and a cleaning process. The image forming process will be explained hereinafter in this order.

First, the charging process is explained. The charging roller 62 is connected to a power supply, not shown. The charging roller 62 is disposed in a manner to be contacted or welded with pressure to the surface of the photosensitive drum 61. A surface layer of the photosensitive drum 61 is uniformly and evenly charged by rotating the charging roller 62 and the photosensitive drum 61 in directions of arrows, respectively. In the charging process in this embodiment, voltage of approximately −1150 [V] was applied to the charging roller 62 to charge the photosensitive drum 61 at approximately −600 [V] uniformly and evenly.

In the exposure process, the exposure device 5 arranged in a manner to face to the photosensitive drum 61 forms the latent image on the photosensitive drum 61 by irradiating on the photosensitive drum 61 the light as the exposure means, corresponding to an image signal. In the photosensitive drum 61 used in this embodiment, which was charged at −600 [V], a portion that has been sufficiently exposed by the exposure device 5 had residential potential of approximately −50 [V].

The developing process is explained next. In the image forming apparatus according to this embodiment, the developing device 63 is arranged in close contact with the photosensitive drum 61. In the developing device 63, the developing roller 631 and the toner supplying roller 632 are disposed in contact with each other and are rotated by the drive unit, not shown, in a direction of an arrow in FIG. 7. The power supply, not shown, applies the voltage to the developing roller 631 and the toner supplying roller 632. Furthermore, in the developing device 63, the developing blade 633 is disposed in contact with the developing roller 631. The power supply, not shown, applies the voltage to the developing blade 633.

Toner 634 inside the developing device 63 is supplied to the developing roller 631 by the action of rotation of the toner supplying roller 632 and the voltage applied to the toner supplying roller 632. The toner 634 is charged by friction of the developing roller 631 and the supplying roller 632. The toner 634 supplied onto the developing roller 631 is carried by the rotation of the developing roller 631 up to a contact portion between the developing blade 633 and the developing roller 631. The toner is then uniformed by the developing blade 633, thereby becoming a thin layer. The toner, which was uniformed as the thin layer on the developing roller 631, is carried up to a contact portion between the developing roller 631 and the photosensitive drum 61. Since the toner 634 is charged at negative polarity, the toner 634 adheres to the portion with high potential in the latent image because of difference in potential between the latent image on the photosensitive drum 61 and the developing roller to form the toner image, thereby visualizing the latent image, and the developing process as described above is completed. It is to be noted that in this embodiment, the voltage of approximately −250 [V] was applied to the developing roller 631 while the voltage of approximately −350 [V] is applied to each of the supplying roller 632 and the developing blade 633. A reversal development method using the developing device 63 can adopt any of known arts such as a two-component magnetic brush developing device, a one-component magnetic brush developing device, or one-component non-magnetic developing device.

On the other hand, the medium accommodated in the paper cassette 67 is taken out of the paper cassette 67 by the feeding roller 68 and is carried to the transfer unit. Next, the transferring process is explained. The transferring roller 65 serving as a means for transferring the toner image to the medium is disposed in a manner to face to the photosensitive drum 61. The power supply, not shown, applied the voltage to the transferring roller 65. The voltage applied to the transferring roller 65 has a polarity opposite to that of the toner 634. The toner image is carried up to the vicinity of the transferring roller 65 by rotation of the photosensitive drum 61 in which the toner image is formed on the surface layer thereof. The toner layer is attracted to the medium by the action of the voltage having been applied to the transferring roller 65, thereby being transferred to the medium. In this embodiment, the voltage to be applied to the transferring roller 65 was set to approximately 1500 [V]. The medium is thereafter carried to the fixing device 66.

In the fixing process, the toner 634 of the toner image formed on the medium is melted by the heat from the heating roller 66a, and the pressure applied from the pressure roller 66b renders the toner 634 adhere to the medium. On the other hand, in some cases, the toner 634 remains at the photosensitive drum 61 to some extent after the transferring process. Therefore, the cleaning blade 70 arranged in contact with the photosensitive drum 61 cleans up the remaining toner by scrapping the toner off. The medium after the fixing process is discharged to an exterior of the image forming apparatus by rotation of the heating roller 66a, the pressurizing roller 66b, and the conveying roller 69.

The effects of this embodiment will be explained with reference to Table 2. As provided in Table 2, any of the Manufacturing examples 1 to 3 have greater values of the MTF than that of Comparative example, which indicates that the clear exposure image with a high contrast can be formed. Furthermore, it has turned out that the value of the MTF becomes greater as the amount of side surface removed by the etching process is larger, thereby indicating that the clear exposure image with high contrast can be formed. It is to be noted that the light amount in Table 2 shows the ratio between a measured value of the light amount in the exposure image by the lens array corresponding to each light emitting portion of the LED array chip 51 and a measured value of the light amount by the lens array in the comparative example.

Provided in Table 2 are the evaluation results of the printed image by the image forming apparatus using each of the lens arrays in the Manufacturing examples 1 to 3 and the Comparative example. The printed image was evaluated based on whether the granular quality, which gives granular impression, was observed or not at the time of printing a uniform image in low concentration, or where the image could be printed clearly or not at the time of printing a thin line of about 84 microns using the image of 300 lines per inch (300 thin lines per inch), for example. The image which was printed without any problems on both of the above criteria was evaluated as "good" while the printed image having any problems on both or either one of those criteria was evaluated as "poor".

As a result, it turned out that the better image can be obtained where the removed surface is larger in the Manufacturing examples. Where the radius after formation of refractive-index distribution is set to r while the radius after removal of the side surface is set to $r_0$ based on those measurement and evaluation, the lens array and the exposure device capable of forming clear images in high contrast can be achieved by forming the rod lens in a manner to remove the side surface of calculated value 0.893 or smaller, i.e., approximately 10 percents or higher, and to satisfy the Equation 2.

Equation 1 is set to $r_0/r \leq 0.893$ (almost equal to 0.9).

In the ion-exchange process of the rod lens as described in the above section concerning the structure of this embodiment, deviation in the process easily occurs at the outer periphery of the rod lens, thereby causing fluctuation in the refractive-index distribution around the outer periphery, which leads to problems such as curvature of the exposure image or contrast reduction. Those problems, however, can be solved by eliminating the outer periphery, which is understood to be the effect of this embodiment. Deviation in the refractive-index distribution at the outer periphery of the rod lens in the ion-exchange process is also caused due to deviations in the environment such as temperature or humidity in this process, deviations in concentration of processing liquid, deviations in the temperature of the processing liquid, deviations in an outer diameter of the glass fiber to be processed into the rod lens, and deviations in compositions of the glass fiber material, adhesion of impure material to the side surface of the glass fiber, and the like, but those deviations are reduced by using the rod lens according to this embodiment, thereby being able to achieve the image in a good condition.

Figure 10:
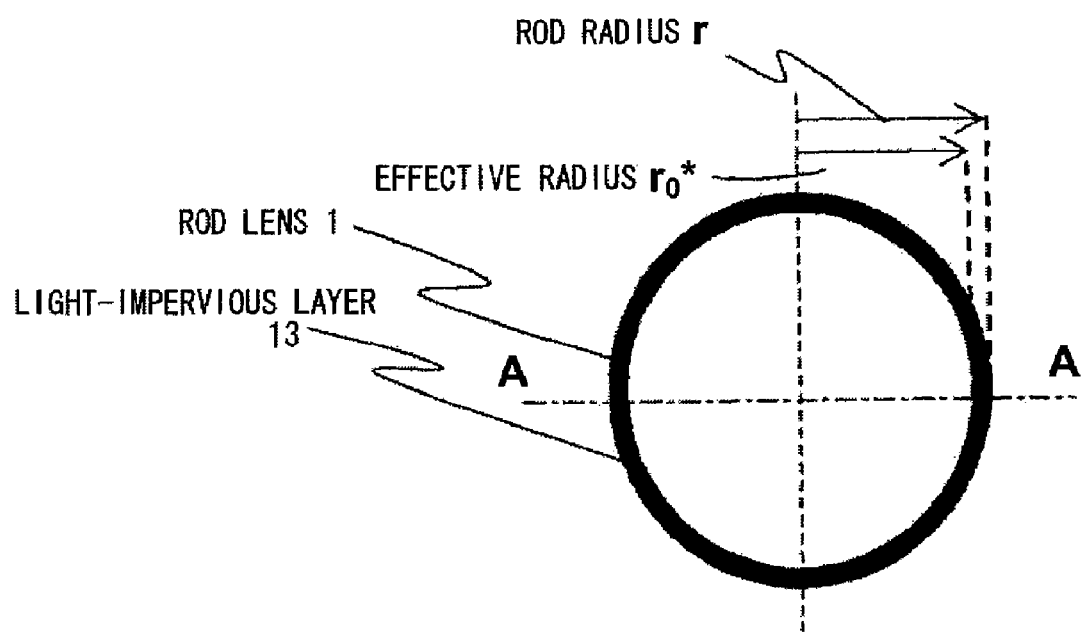
FIG. 10 is a cross-sectional view of a modification example of the rod lens according to the first embodiment of this invention.
Figure 11:
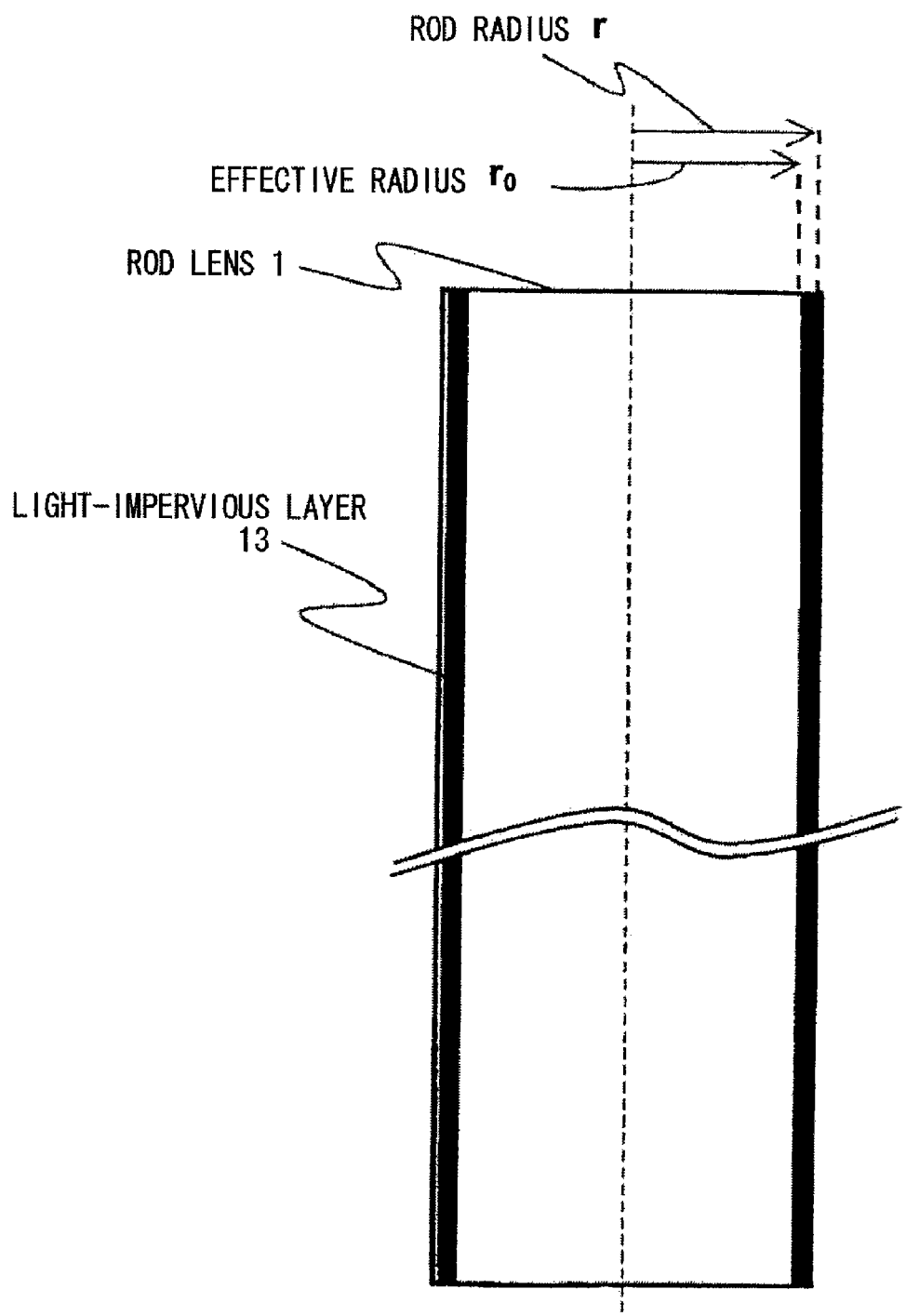
FIG. 11 is a side view of the modification example shown in FIG. 10.

It is to be noted that the rod lens in this embodiment may be formed by providing a light-impervious layer 13 in the vicinity of the side surface of the rod lens 1 having an effective radius of $r_0*$ after formation of the refractive-index distribution thereto, as shown in FIGS. 10 and 11.

Figure 12:
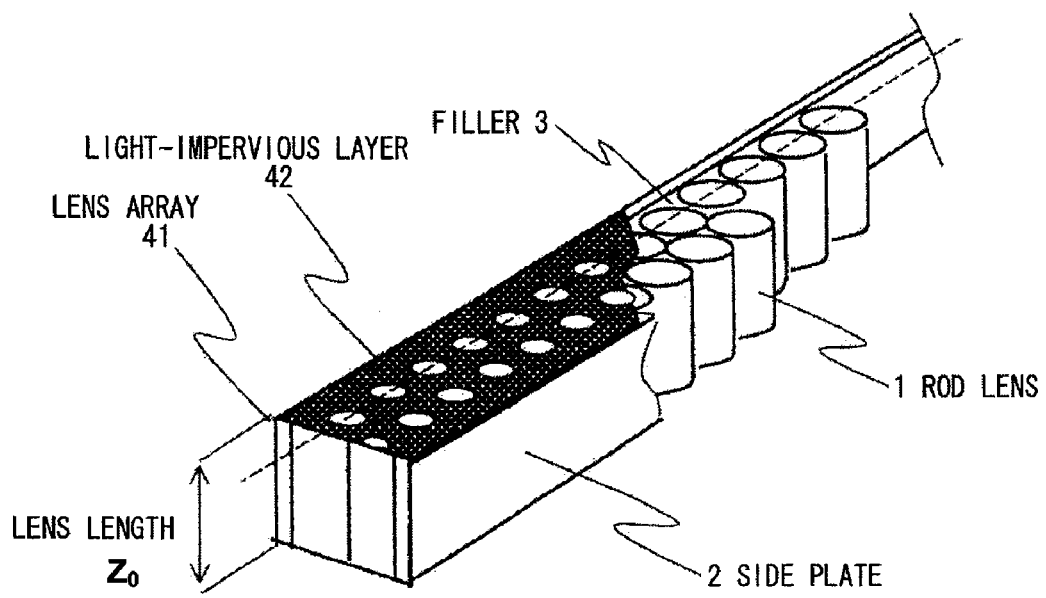
FIG. 12 is a perspective view of another modification example of the rod lens according to the first embodiment of this invention.

In the lens array of this embodiment, furthermore, a light-impervious layer 42 may be partially provided for at least either one of the end faces of the lens array 41 as shown in FIG. 12. The end face of the lens array 41 may be provided with the light-impervious layer 42 directly or may be provided with a member in which a pattern for blocking out the light beam from the luminous source was already formed.

Second Embodiment

Figure 13:
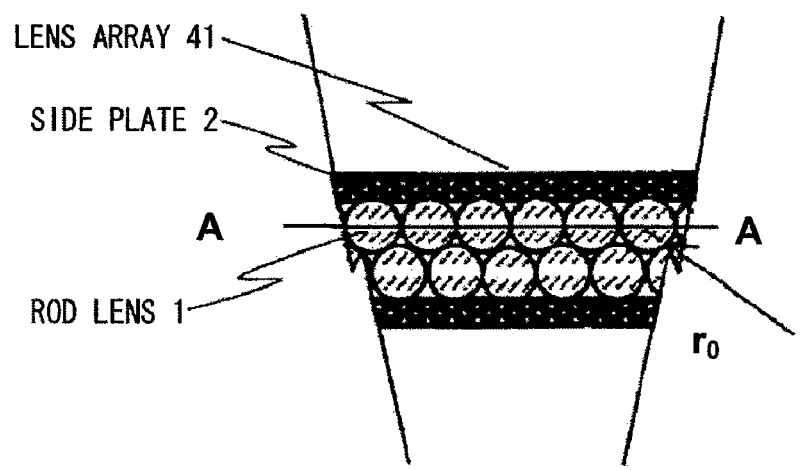
FIG. 13 is a cross-sectional view of a substantial part of a lens array composed of rod lenses according to a second embodiment of this invention.
Figure 14:
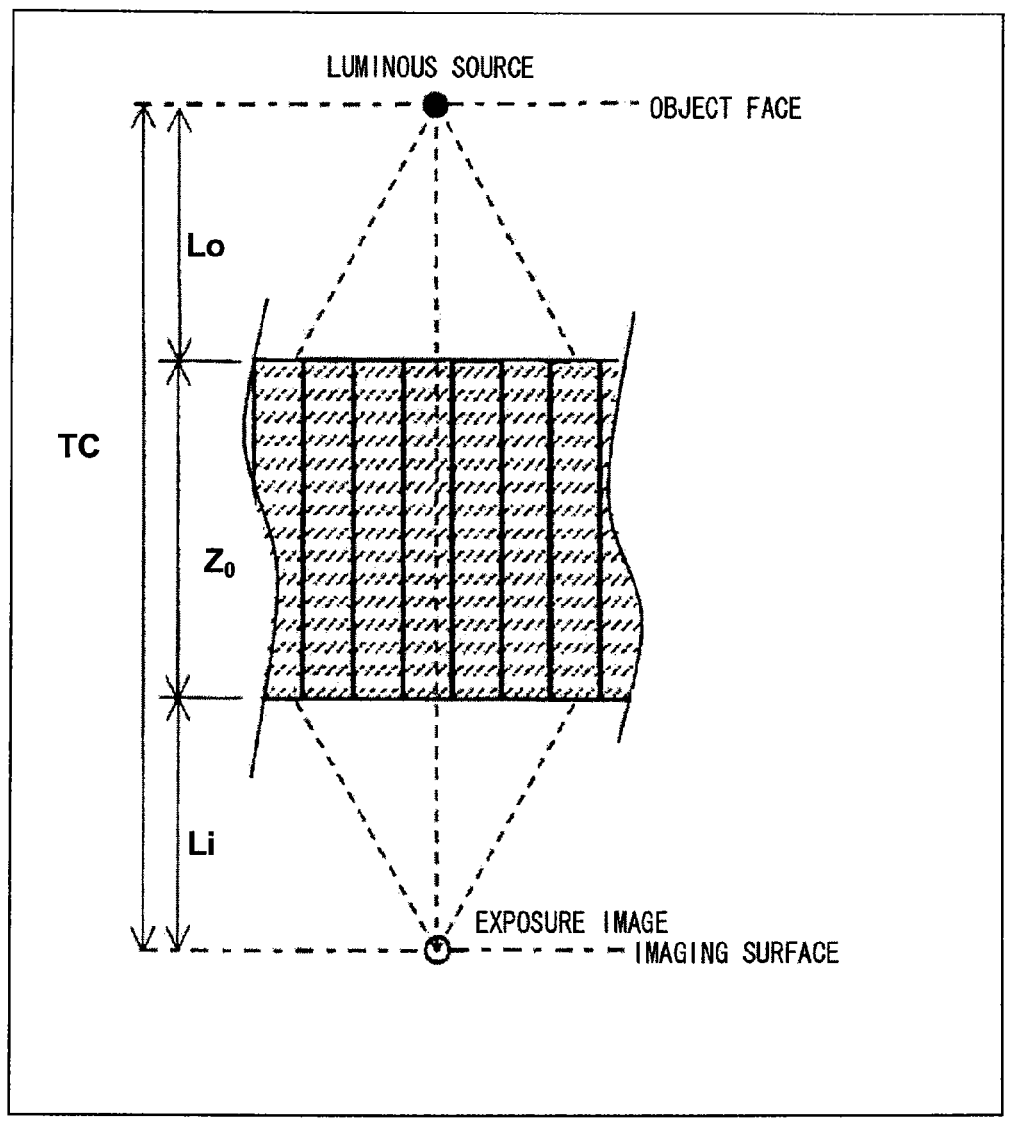
FIG. 14 is a side view of a substantial part of the lens array composed of the rod lenses according to the second embodiment of this invention.

A structure of the lens array according to a second embodiment will be explained next. FIGS. 13 and 14 are schematic views of a lens array. In a manner similar to the lens array according to the first embodiment, the lens array is formed such that a refractive-index distribution is formed from a central axis to an outer periphery, in which the rod lenses 1 having been subject to the process for making the side surfaces thereof absorb the light beam from the luminous source are arrayed in one or more lines between two side plates 2. The filler 3 is filled into gaps and hardened to form the lens array.

The distances Lo between the luminous light source and the one end of rod lens and Li, the distance from the imaging surface to a second end of the rod lens in FIG. 14 are adjusted to set Li=Lo=Lf on the condition that a focal length of the lens array 41 is set to be Lf. A distance TC is a conjugation length of the lens array 41, which is a distance between a surface of an object arranged with the luminous source and an imaging surface where the exposure image of the luminous source is formed by the lens array 41, and is set to be TC=Li+$Z_0$+Lo. Herein, there is such a relation expressed by the following Equation 3 between an effective radius $r_1$ [mm] of a portion of the rod lens, through which the light beam from the luminous source passes, and the conjugation length TC [mm], in this embodiment.

$$r_1 \leq 0.015\,TC + 0.113 \qquad \text{[Equation 3]}$$

Equation 3 as described above is proven using a result of study about the structure of the lens array in this embodiment according to calculation analysis. The MTF and the focal length Lf of the exposure image by the lens array were calculated using the optical design evaluation software Code V manufactured by Optical Research Associates. In the rod array, which was calculated, a refractive-index distribution n(r) of the rod lens is expressed by the following Equation 4 on the condition that a refractive-index on a central axis of the rod lens is set to no, a radius of the rod lens is set to r, and a refractive-index constant is set to g.

$$n(r) = no(1 - (gr)^2/2) \qquad \text{[Equation 4]}$$

The same value of the MTF as that of the first embodiment was determined by calculation. The light emitting element array composed of the LED array chips 51, the drivers IC 52, the wiring board 53, and the wires 54 of the exposure device 5 shown in FIG. 6 in the first embodiment are used as light emitting parts of a model of the exposure device, which is subject to calculation. That is, a state where every other light emitting point from among all the light emitting points of the LED array chips is lighted up was shot using a CCD camera, and a brightness distribution of a shot image, which was converted into numbers, was used. It is to be noted that the LED array chips are used for the electrophotographic printer capable of printing an A4-size paper at 1200 [dpi] resolution, as described in the first embodiment, in which the light emitting portions are formed with intervals of approximately 0.021 [mm]. More specifically, each of the intervals between the light emitting points used for calculation is approximately 0.042 [mm]. Furthermore, values of the lens length $Z_0$ of the lens array 41 and the focal length Lf are respectively set to values at the time of maximum value of the MTF.

Figure 15:
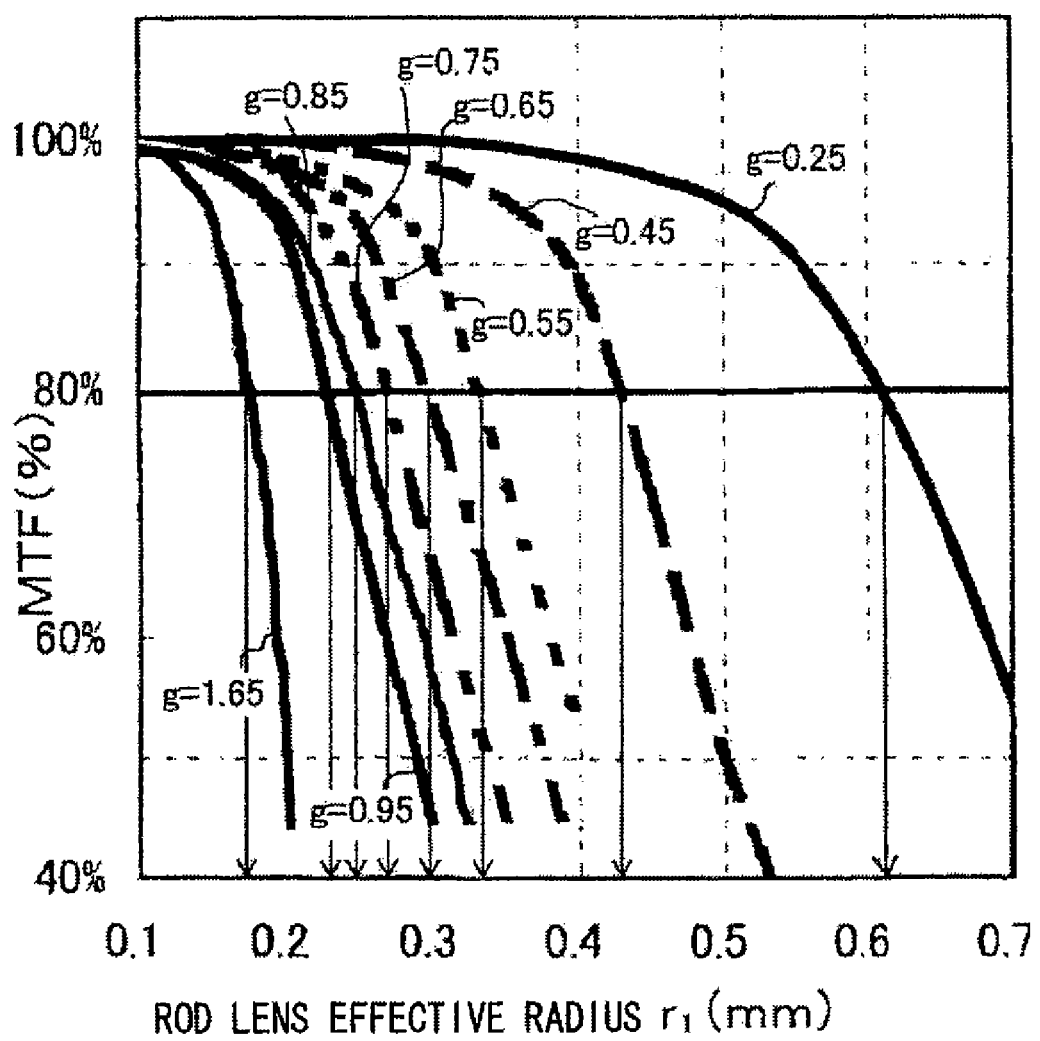
FIG. 15 is a view showing a relation between an MTF and a radius of the lens array according to the second embodiment of this invention.

A relation among the refractive-index distribution constant g of the rod lens, the effective radius $r_1$ of the rod lens, and the MTF was calculated. A value of the refractive-index no on the central axis of the rod lens, which was used for calculation, was set to be equal to 1.60. A distribution as shown in FIG. 15 resulted from plotting the results of the calculation onto a graph, in which the value of MTF is set to the ordinate axis and the effective radius $r_1$ of the rod lens is set to the abscissa axis. Herein, in each of the rod lenses manufactured by the method described above, the refractive-index no on the central axis is approximately set to no=1.6. Furthermore, there is no difference in the results after the same calculation on the condition that no is set to 1.50 and 1.70.

Furthermore, a value the effective radius $r_1$ of the rod lens was read from the graph in the FIG. 15, in which the value of the MTF was set to 80% of a value of each refraction-index distribution constant g. More specifically, the value $r_1$ on the abscissa axis was read out from the graph in FIG. 15 by drawing a straight line (a solid line in FIG. 15) in parallel with the abscissa axis indicating MTF=80% and by drawing lines (arrows in FIG. 15) in parallel with the ordinate axis from points of intersections of the solid line and curves to the bottom directly. In using the exposure device, it is to be noted that such quality deterioration as granular quality in a half-tone image, a blur of a thin line, nonlinear characteristics of gradation characteristics, and the like, are resolved and a printed image with high quality can be obtained in the case where the image is formed at a high resolution of approximately 1200 dpi by using the image forming apparatus at the time when the maximum value MTF from among values MTF of all light emitting points in the exposure device is set to 80% or more.

Figure 16:
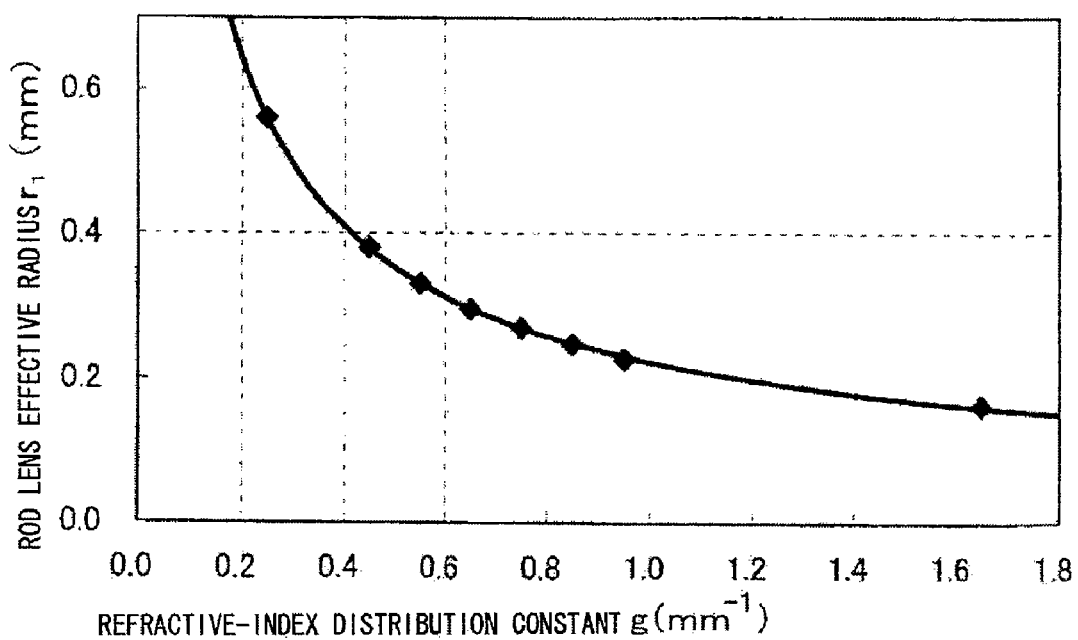
FIG. 16 is a view showing a relation between the radius and a refractive-index distribution constant of the rod lens according to the second embodiment of this invention.

A graph in FIG. 16 indicating markers in a rhombus shape (♦) resulted from plotting the effective radius r, of the rod lens on the condition that the value MTF is set to 80% of a value of each refraction-index distribution constant g, which resulted in a manner as described above onto a graph in which the abscissa axis is set to the refractive-index distribution constant g and the ordinate axis is set to the effective radius $r_1$ of the rod lens. Furthermore, where the graph indicated by the markers in a rhombus shape in FIG. 16 is approximated using a curve, the curve in a solid line shown in FIG. 16 resulted. This curve indicates a relation between the refractive-index distribution constant g and the effective radius $r_1$ of the rod lens on the condition that the value MTF is set to 80% of a value of each refraction-index distribution.

Figure 17:
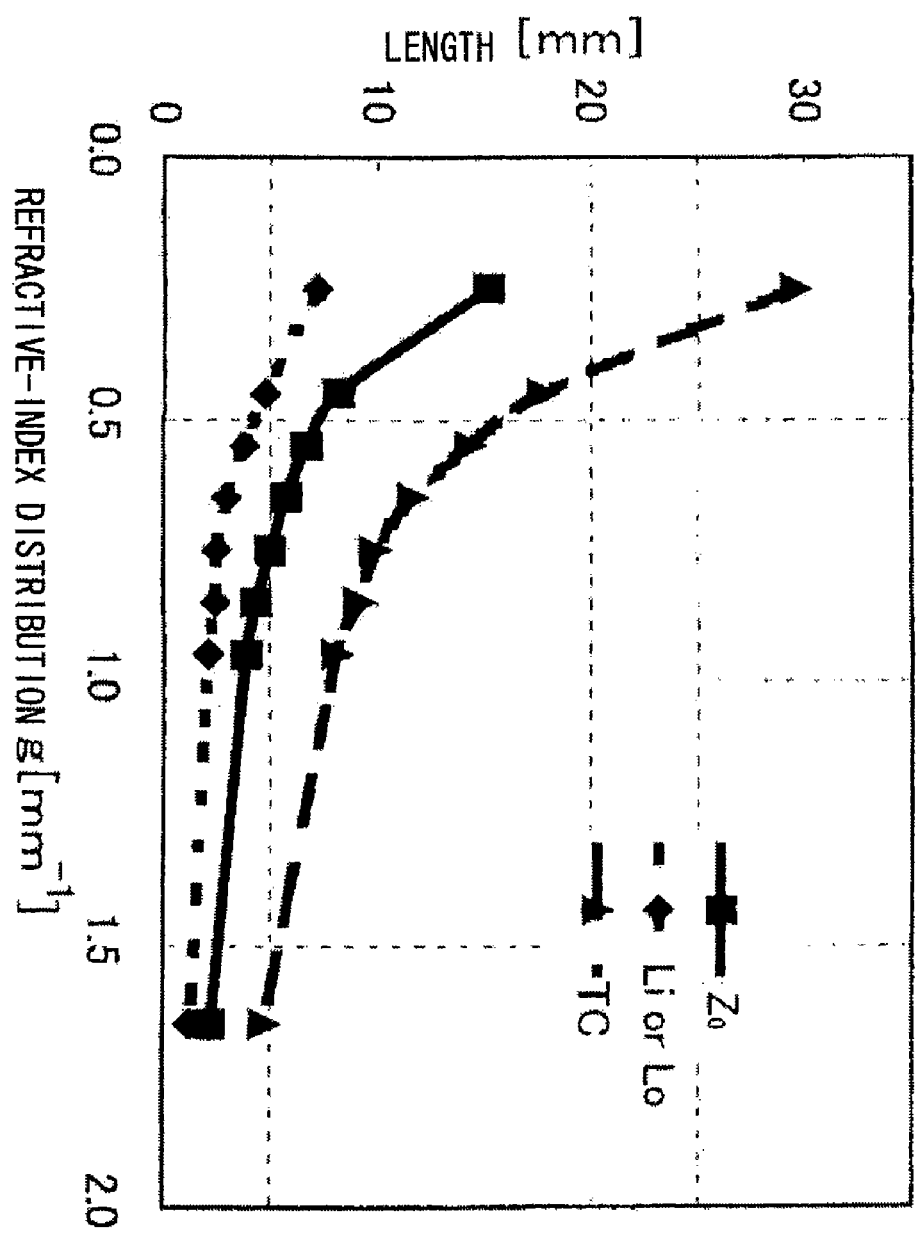
FIG. 17 is a view showing a relation between a length and the refractive-index distribution constant of the rod lens according to the second embodiment of this invention.

FIG. 17 shows a graph about calculation results the refractive-index distribution constant g of the rod lens, the conjugation length TC [mm], and a lens length at the time of the MTF of 80%. Points plotted by markings (■, ♦, ▲) are defined as calculation results, and each of the curves connects those calculation results. According to those calculation results, the conjugation length TC becomes greater as a value of the refractive-index distribution constant g is smaller. According to those calculation results, since the conjugation length TC is uniquely determined based on the value of the refractive-index distribution constant g by adjusting the lens length $Z_0$, the focal length Lf, and the distances Li, $L_0$ in a manner to maximize the MTF, the effective radius $r_1$ of the rod lens and the refractive-index distribution constant g on the condition that the MTF indicated by the curve in FIG. 16 is set to 80% can be expressed as a relation between the conjugation length TC and the effective radius $r_1$.

Figure 18:
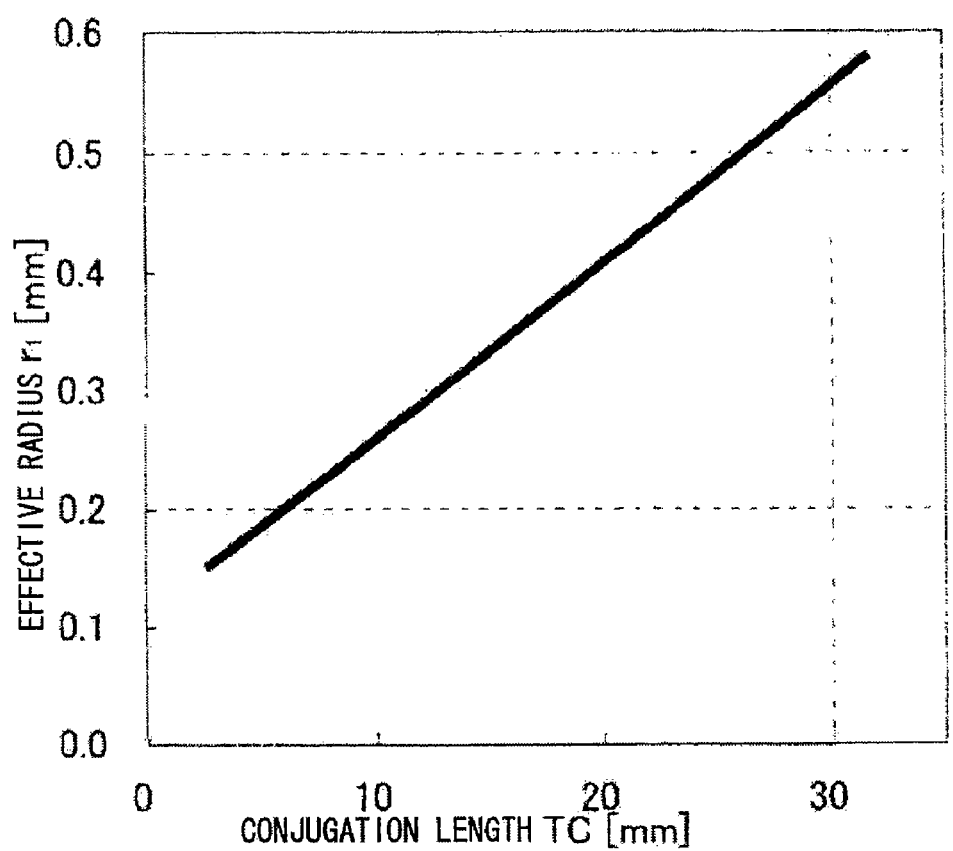
FIG. 18 is a relation between a conjugation length and an effective radius of the rod lens according to the second embodiment of this invention.

FIG. 18 shows a relation between the conjugation length TC and the effective radius $r_1$ at the time where the MTF is 80%. As shown in FIG. 18, the relation between TC and $r_1$ is approximated by a straight line [Equation 5].

$$r_1 = 0.015\,TC + 0.113 \qquad \text{[Equation 5]}$$

Where the structure of the lens array satisfies the condition indicated on the straight line and a portion under the straight line, the value MTF is 80% or more, thereby being able to achieve the exposure image with sufficiently high contrast. Thus, the Equation 3 can be obtained.

$$r_1 \leq 0.015\,TC + 0.113 \qquad \text{[Equation 3]}$$

The lens array according to this embodiment can be manufactured in a manner similar to that of the first embodiment. In the same manner as the first embodiment, seven hundred and seventy (770) rod lenses 1 are arranged in two lines in this embodiment, and a width of the lens array sheet, i.e., a width in a direction perpendicular to the central axis direction, is set to 220 mm. The glass-reinforced epoxy was used for the side plate 2 and the thermosetting black silicon resin was filled as the filler 3, thereby performing a heat hardening process for the formation.

In this embodiment, the lens length $Z_0$ and the effective radius $r_1$ of the lens array 41 are set as provided in Table 3 to be mentioned later. Furthermore, the conjugation length TC of each lens array in this embodiment is measured in a manner similar to that of the first embodiment and is as provided in Table 3. The exposure device according to this embodiment is provided with the lens array 41 as shown in FIG. 6, in a manner similar to that of the first embodiment. The lens array 41 according to this embodiment is mounted on the image forming apparatus in a manner similar to that of the first embodiment. The lens array 41 satisfies the condition of the effective radius $r_1$ and the conjugation length TC, which is expressed by Equation 3.

Operation of the lens array, the exposure device, and the image forming apparatus according to the second embodiment of this invention is the same as that of the first embodiment, so that detailed description is omitted.

Effects of this embodiment will be explained using experimental results. The lens array is manufactured on the conditions described in the second embodiment, and measured results of optical characteristics are provided in Table 3.

The effects of this embodiment are achieved in terms of the following two points. One point is that the optimization of each structure and characteristic of the lens array and the rod lens reduces a so-called field curvature, in which the formed exposure image deteriorates contrast or becomes curved due to displacement of a position where the light beam, which passes through the end portion of the rod lens, forms the image.

The other point is as follows. In the rod lenses composing the rod lens, displacement occurs between a position where the light beam, which passes through the rod lenses near the luminous source, forms the image and a position where the light beam, which passes through the rod lenses comparatively far away from the luminous source, forms the image, thereby causing deterioration on contrast due to overlap of the exposure images. On the other hand, by setting a small view angle of the rod lens, the light beam becomes unable to pass through the rod lenses at a more distant position than that of the luminous source, so that the overlap of the exposure images is eliminated to reduce deterioration in a contrast of the exposure image. Therefore, the view angle of the rod lens is determined based on the refractive-index distribution contrast g and the effective radius $r_1$, so that the optimization of each structure and characteristic of the rod lens solves contrast deterioration in the exposure image.

TABLE 3

| | Comparative Example | Manufacturing Example 1 | Manufacturing Example 2 | Manufacturing Example 3 |
|---|---|---|---|---|
| Effective Radius $r_1$ [mm] | 0.272 | 0.261 | 0.250 | 0.240 |
| Lens Length $z_0$ [mm] | 4.400 | 4.400 | 4.400 | 4.400 |
| Optical Characteristics Conjugation Length TC [mm] | 9.100 | 9.100 | 9.100 | 9.100 |
| MTF [%] | 66 | 72 | 81 | 84 |
| Light Amount Ratio | 1.00 | 0.86 | 0.78 | 0.73 |
| Image Characteristics | poor | poor | good | good |

| | Manufacturing Example 4 | Manufacturing Example 5 | Manufacturing Example 6 | Manufacturing Example 7 |
|---|---|---|---|---|
| Effective Radius $r_1$ [mm] | 0.450 | 0.350 | 0.340 | 0.330 |
| Lens Length $z_0$ [mm] | 6.870 | 6.870 | 6.870 | 6.870 |
| Optical Characteristics Conjugation Length TC [mm] | 15.100 | 15.100 | 15.100 | 15.100 |
| MTF [%] | 38 | 73 | 80 | 83 |
| Light Amount Ratio | 1.02 | 0.63 | 0.62 | 0.58 |
| Image Characteristics | poor | poor | good | good |

The MTF [%] in Table 3 was measured using a method similar to that of the first embodiment. The MTF herein is a value of the exposure image at the time of lighting up every other light emitting portion from among all light emitting portions which were provided with intervals of approximately 0.021 [mm] on the LED array chips 51 in the exposure device according to this embodiment. As shown in FIG. 3, the lens array, which satisfies the condition in this embodiment, results in the MTF of 80% or more, thereby enabling formation of the exposure image with sufficiently high contrast. Provided in Table 3 are evaluation results of the printed image using the image forming apparatus according to this embodiment. The evaluations of the printed image are the same as those of the first embodiment. Each of the image forming apparatuses, which satisfy the condition in this embodiment, can result in the printed image in a good condition.

Third Embodiment

A structure of the lens array according to the third embodiment will be described next. The third embodiment has the same structure as that of the second embodiment in that there is such a relation as expressed by the following Equation 3 between the effective radius $r_1$ [mm] of a portion of the rod lens 1, through which the light beam from the luminous source passes, and the conjugation length TC [mm] which is a distance between the object face of the lens array 41, as shown in drawings, and the imaging surface.

$$r_1 \leq 0.015\, TC + 0.113 \qquad \text{[Equation 3]}$$

Furthermore, with respect to the conjugation length TC [mm] in the lens array 41, there is such a relation as expressed by the following Equation 6.

$$9.100 \leq TC \leq 15.100 \quad \text{[Equation 6]}$$

The exposure device and the image forming apparatus according to this embodiment have the same structure as those of the second embodiment in that there is such a relation as expressed by Equation 7 between the effective radius $r_1$ of the rod lens 1 as shown in FIG. 12 and a distance Lw between the light emitting point of the LED array chip 51 of the exposure device 5 and the charge generating layer 61b serving as a photosensitive layer of the photosensitive drum 61, which is the latent image carrier (see FIG. 8).

$$r_1 \leq 0.015 \, Lw \leq 0.113 \quad \text{[Equation 7]}$$

Furthermore, with respect to the distance Lw [mm] in the exposure device and the image forming apparatus according to this embodiment, there is such a relation as expressed by the following Equation 8.

$$9.100 \leq Lw \leq 15.100 \quad \text{[Equation 8]}$$

Operation of the lens array, the exposure device, and the image forming apparatus according to the third embodiment of this invention is the same as that of the first embodiment, so that detailed description is omitted.

The effects of the third embodiment of this invention will be explained with reference to Table 4. Where the lens array according to the Manufacturing example 9 was manufactured and the exposure device was composed of the lens array to measure the optical characteristics thereof, the MTF value was 80%. However, printing at 1200 [dpi] using the image forming apparatus provided with the exposure device caused the halftone portion to have streaks of inconsistent density in a paper conveyance direction. This is because the image deficiencies in a streaked manner occurred due to unevenness of the light amount in the partial exposure images, which was caused since the conjugation length TC of the lens array is as great as 18.300 [mm] to cause displacement of the light beams from inclined rod lenses from among the rod lenses composing the lens array with respect to the image location, resulting in overlap between the light beams and the exposure image.

Furthermore, where the conjugation length TC is great, the apparatus to be provided with the lens array increases in size, thereby making it impossible to miniaturize the apparatus. Furthermore, in the case where the focal length Lf is long, the distances Li, Lo become longer, thereby increasing the effects on displacement due to inclinations of the rod lenses at the time of manufacturing the lens array or at the time of mounting the lens array onto the apparatus, thereby leading to problems such as curvature of the exposure image, quality defects such as contrast deterioration of the exposure image, and the like. Furthermore, even though an attempt was made to manufacture the lens array according to the Manufacturing example 8 and mount it onto the exposure device, the conjugation length TC was as small as 4.980 [mm], thereby making it difficult to construct the exposure device in a manner not to cause the displacement or the inclination of the lens array.

To obtain measured values of the conjugation length TC and the MTF of the lens array as shown in Table 4, the wiring board 53, on which the LED array chips 51 were disposed, the LED array chips 51 being provided with the light emitting portions with intervals of approximately 0.021 [mm], and the lens array were disposed on a machine microscope, in which every other light emitting portion in the LED array chip 51 was lighted up. The measured values resulted from analyzing the image which was obtained by scanning by using a CCD of the machine microscope, the exposure image of the light emitting portions by the lens array. The measuring object became so small that the light amount ratio could not be measured.

Furthermore, it was impossible to form the image forming apparatus by using the lens array according to the manufacturing example 8 since the distances Li, Lo could not be adjusted in a manner to be equal to the focal distance Lf of the lens array. On the other hand, in the Manufacturing examples 2 and 6 shown in Table 4, the value MTF was great enough to construct the exposure image capable of achieving the exposure images with high contrast as well as to construct the image forming apparatus capable of forming the printed images in a good condition.

As described above, the lens array and the exposure device according to this embodiment can achieve the MTF value sufficiently great and the exposure images with high contrast, while the image forming apparatus according to this embodiment can achieve the printed images in a good condition.

Other than the exposure devices and the image forming apparatuses described in the first to third embodiments, the lens array serving as an imaging optical element can also be used for a lighting fixture, an image input device, and the like.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

It will be appreciated by those skilled in the art that changes could be made to the embodiments described above without departing from the broad inventive concept thereof. It is

TABLE 4

| | | Manufacturing Example 8 | Manufacturing Example 2 | Manufacturing Example 6 | Manufacturing Example 9 |
|---|---|---|---|---|---|
| Effective Radius $r_1$ [mm] | | 0.160 | 0.250 | 0.340 | 0.275 |
| Lens Length $z_0$ [mm] | | 2.180 | 4.440 | 6.870 | 8.710 |
| Optical Characteristics | Conjugation Length TC [mm] | 4.980 | 9.100 | 15.100 | 18.300 |
| | MTF [%] | 90 | 80 | 80 | 86 |
| | Light Amount Ratio | N/A | 0.78 | 0.62 | 0.66 |
| Image Characteristics | | N/A | good | good | poor |

What is claimed is:

1. A lens array having a plurality of rod lenses with optical axes in parallel with one another, said rod lens having a refractive-index distribution in a radial direction, said rod array having a relation set to $r_1 \leq 0.015$ TC+0.113, wherein a conjugation length TC (mm) is set between an object face of a lens array and an imaging surface, and a radius $r_1$ is set as a radius of the rod lens' portion through which a light beam from a luminous source can pass.

2. The lens array according to claim 1, wherein said conjugation length TC (mm) satisfies an equation of $9.1 \leq TC \leq 15.1$.

3. An exposure device, wherein a luminous source is disposed in a manner to face to either one of lens end faces of said lens array according to claim 1, and wherein an imaging surface is formed in a manner to face to the other lens end face.

4. An image forming apparatus comprising an image forming unit adopting said exposure device according to claim 3.

5. An image forming apparatus performing exposure process using a lens array having a plurality of rod lenses with optical axes in parallel with one another, said rod lens having a refractive-index distribution in a radial direction, said image forming apparatus having a relation set to $r_1 \leq 0.015$ Lw+0.113, wherein a distance Lw (mm) is set between a light emitting point of a luminous source launching a light beam into said lens array and a photosensitive layer of a latent image forming member, and wherein a radius $r_1$ is set as a radius of the rod lens' portion through which a light beam from a luminous source can pass.

6. The image forming apparatus according to claim 5, wherein said distance Lw (mm) satisfies an equation of $9.1 \leq Lw \leq 15.1$.

7. A lens array comprising of a plurality of rod lenses, each rod lens having an effective radius of $r_0$ and having a refractive-index distribution varying in a radial direction,
wherein each of said plurality of rod lenses is initially formed with a radius of r and said refractive-index distribution is set when the rod lens has the radius r,
wherein all or part of a side surface of each rod lens is removed after formation of said refractive-index distribution to obtain the effective radius $r_0$ prior to securing the plurality of lens rods into the lens array, and
wherein the ratio of the radius r to the radius $r_0$ is 0.9 or less.

8. The lens array according to claim 7, wherein said outer periphery is removed by an etching process.

9. The lens array according to claim 8, wherein said rod lens is made of a glass material, and wherein fluorinated etchant is used in said etching process.

10. The lens array according to claim 7, wherein said outer periphery of said rod lens is removed by a grinding or polishing process.

11. An exposure device, wherein a luminous source is disposed in a manner to face to either one of lens end faces of said lens array according to claim 7 and wherein an imaging surface is formed in a manner to face to the other lens end face.

12. An image forming apparatus comprising an image forming unit adopting said exposure device according to claim 11.

13. A lens array comprising of a plurality of rod lenses, each rod lens having an effective radius of $r_0^*$ and having a refractive-index distribution varying in a radial direction,
wherein each of said plurality of rod lenses is initially created with a radius of r and said refractive-index distribution is set when the rod lens has the radius r,
wherein all or part of a side surface of each rod lens is removed after formation of said refractive-index distribution to obtain an effective radius $r_0^*$, and
wherein the light impervious portion is provided to the side surface of the lens rod for blocking out the light beam prior to securing the plurality of lens rods into the lens array, and.
wherein the ratio of the radius r to the radius $r_0^*$ is 0.9 or less.

14. An exposure device, wherein a luminous source is disposed in a manner to face to either one of lens end faces of said lens array according to claim 13, and wherein an imaging surface is formed in a manner to face to the other lens end face.

15. An image forming apparatus comprising an image forming unit adopting said exposure device according to claim 14.

* * * * *